Nov. 11, 1969  C. E. FAXON  3,478,237
ELECTROMAGNETIC ATTRACTING AND REPELLING MOTOR
Filed Aug. 17, 1967  2 Sheets-Sheet 2
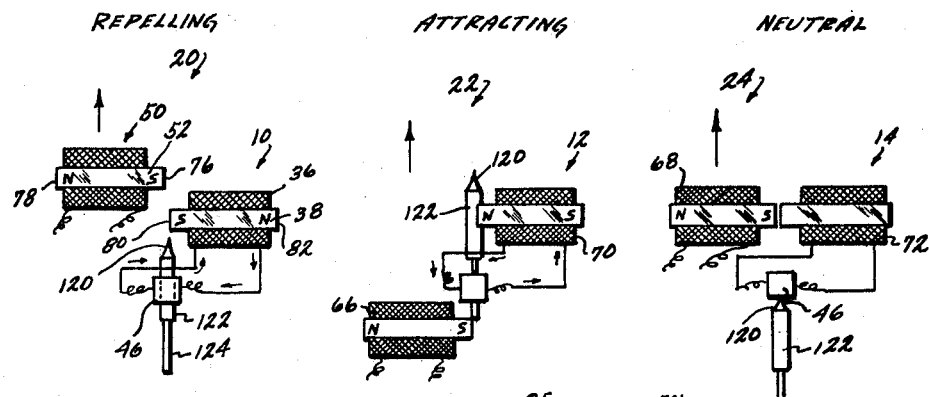
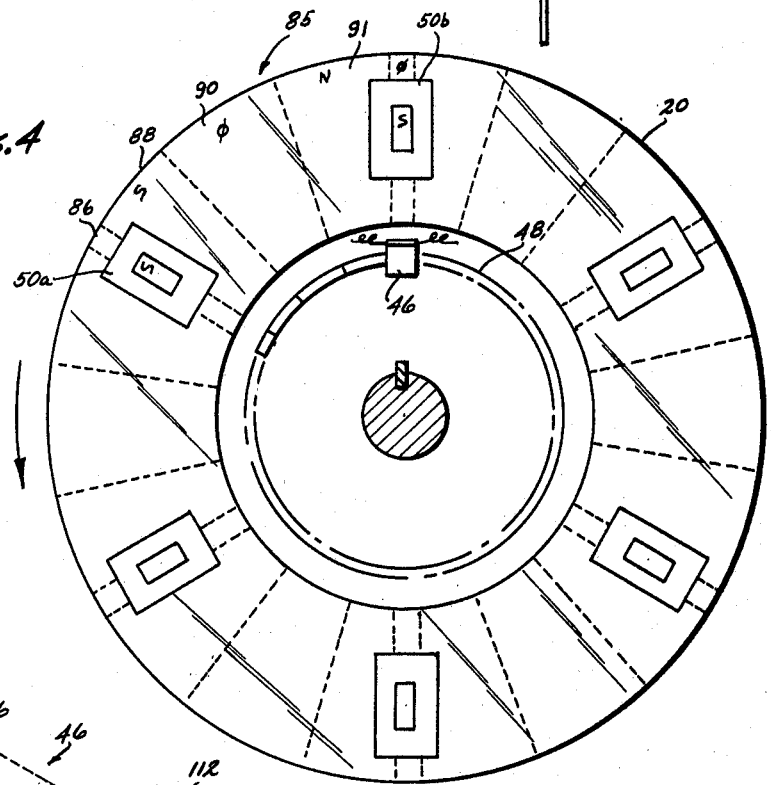
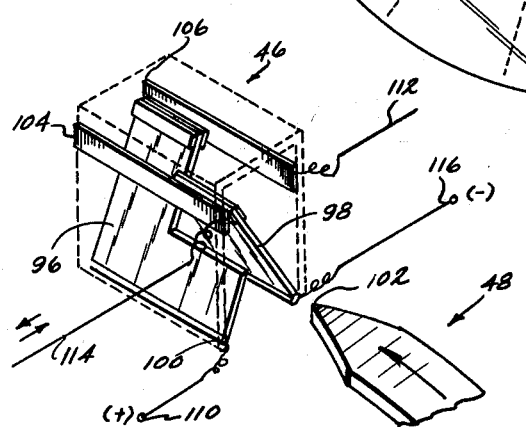
INVENTOR
CHARLES E. FAXON
BY Nilsson, Robbins & Anderson
ATTORNEYS

United States Patent Office 3,478,237
Patented Nov. 11, 1969

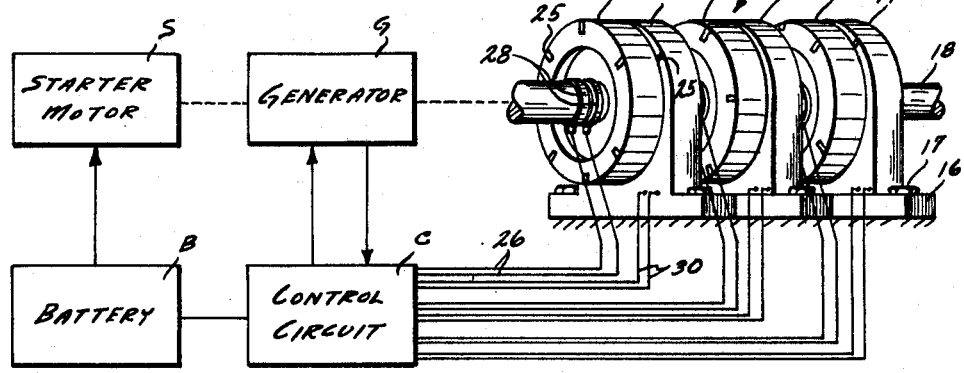
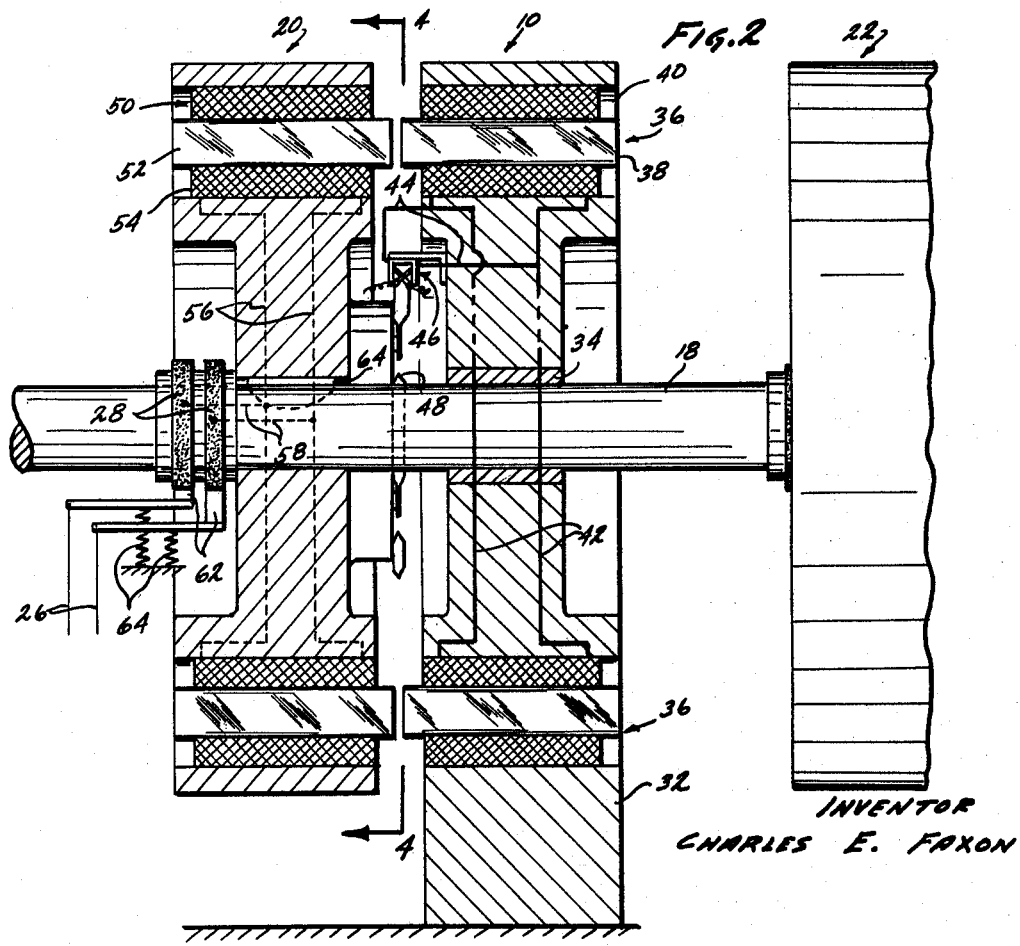

3,478,237
ELECTROMAGNETIC ATTRACTING AND REPELLING MOTOR
Charles Edward Faxon, Los Angeles, Calif.
(15232 Dittmar Drive, Whittier, Calif. 90603)
Filed Aug. 17, 1967, Ser. No. 661,449
Int. Cl. H02k 11/00, 1/06
U.S. Cl. 310—68                                                   6 Claims

ABSTRACT OF THE DISCLOSURE

Disclosure is an electromagnetic motor apparatus wherein a shaft is rotatively supported in stationary structures (stators) which also support a plurality of electromagnets that are disposed in a circular array. A rotor is provided on the shaft for operation with each stator or stationary unit and also carries electromagnets fixed in a circular pattern coinciding to that for the electromagnetis in the stator. A switching apparatus is included between the stator and the rotor to accomplish alternate driving currents through the electromagnets in the rotor, in synchronism with the rotation of the rotor so that the individual electromagnets in the rotor are alternately attracted and repelled by individual magnets in the stator whereby to accomplish efficient rotary power.

BACKGROUND AND SUMMARY OF THE INVENTION

The existing electromechanical art is replete with motor structures. In general, these structures vary widely in philosophy and form. However, a need invariably exists for a machine which can be more economically manufactured or which is capable of greater efficiency. In general, the present invention is urged with the objective of satisfying such needs.

Specifically, the present invention employs the time-aged knowledge that opposite poles of a pair of bar magnets possess a strong attraction while the like poles of such magnets forcibly repel each other. Utilizing that phenomenon, the present invention provides one set of electromagnets in a rotary structure and a cooperating set of magnets in a stationary or stator structure. The rotor structure then actuates a switching system, in accordance with the relative position between the rotor and the stator, providing electrical currents in the electromagnets of the rotor which develop driving forces in association with the electromagnets fixed in the stator. That is, as the rotor structure revolves, the electrical currents therein are reversed in synchronism with the rotation so that the electromagnets in the rotor continuously are either: attracted, repelled or substantially unaffected, by the electromagnets in the stator. Thus, by reason of the controlled switching system, an effective special-purpose motor is provided.

BRIEF DESCRIPTION OF THE DRAWINGS

In the drawing, which constitutes a part of this specification, an exemplary embodiment demonstrating various objectives and features hereof is set forth as follows:

FIGURE 1 is a perspective and block diagram of a motor structure embodying the principles of the present invention;

FIGURE 2 is a vertical sectional view taken centrally through a portion of the structure of FIGURE 1;

FIGURE 3 is a diagrammatic representation illustrative of the operation of the system of FIGURE 1;

FIGURE 4 is a sectional view taken along line 4—4 of FIGURE 2; and

FIGURE 5 is a perspective view of a portion of the structure of FIGURE 1.

DESCRIPTION OF ILLUSTRATIVE EMBODIMENT

Referring initially to FIGURE 1, there is shown a motor M constructed in accordance with the principles of the present invention to provide a rotary-drive power output. The motor M is mechanically coupled (as indicated by dash line) to a generator G and a starter motor S. Furthermore, a motor M is connected through a control circuit C which is in turn connected both to a battery B and to the generator G. Finally, the battery B is connected to the starter motor S.

The configuration depicted in FIGURE 1, is substantially in accordance with the techniques widely employed in automotive electrical systems. In operation, the starter motor S is energized, drawing current from the battery B, and thereby driving the generator G and the motor M. The motor M is thus rapidly brought to operating speed and thereby drives the generator G. Of course, the starter motor S incorporates a release coupling and is therefore disengaged unless operatively driving the motor M. As the motor M operates, the electrical power therefore is drawn through the control circuit C in accordance with the needs of the motor M, determined by current load speed and so on. The control circuit C may incorporate various cutouts, control relays, and other structure as very well known in the prior art serving to regulate the flow of currents to and from the battery B in accordance with the operating state of the system.

Considering the motor M in greater detail, stationary structures or stators 10, 12, and 14 are affixed on a platform 16 that is indicated to be rigidly mounted, as by studs 17. The stators 10, 12, and 14 are somewhat circular in form and receive a central shaft 18 which is carried in bearings that are fixed within the stators. The shaft 18 also carries rotors 20, 22, and 24 which are keyed to the shaft for rotary motion therewith.

In operation, the rotors and the stators each carry a plurality of peripherally spaced electromagnets 25 which provide the magnetic forces to rotate the rotors and the shaft 18. This rotary drive power is provided by the magnets 25 and in rotors being alternately attracted and repelled by the similar magnets in the stators.

The magnets 25 comprise electromagnets (considered in detail below) and are driven by current from the control circuit C. Specifically, three pairs of conductors 26 are connected from the control circuit C individually to a pair of slip rings 28 associated individually with each of the rotors 20, 22, and 24. The slip rings are then connected to the electrically serial electromagnets within the rotors. That is, the individual electromagnets in each unit are serial; however, the three units are in parallel.

Somewhat similarly, conductor pairs 30 supply current from the control circuit C to electromagnets 25 in the stators 10, 12, and 14. However, the current flowing through the conductor pairs 30 is periodically reversed, synchronously with the rotation of shaft 18 so as to preserve the attraction-repulsion forces which drive the shaft 18.

Considering the exemplarly structure in somewhat greater detail, the rotor 20, along with the stator 10 is shown in sectional detail in FIGURE 2. The rotor 10 may comprise a wide variety of materials as synthetics, including fiber glass as well as other molded or formed plastics. Similar material may be employed in the stator 10. Structurally, the stator and rotor elements are somewhat similar, however, while the rotor 20 is substantially round, in the form of a wheel, the stator 10 comprises a circular portion integral with a support base. That is, the bottom of the stator 10 comprises a support base 32 which is rigidly affixed to a reference location suitable to support the shaft 18. In this regard, a bearing 34 is centrally fixed in the stator 10, in to which bearing the shaft 18 is journaled.

A plurality of stator electromagnets 36 are radially positioned in a circular pattern about the stator 10. Each of the magnets including a paramagnetic aramature 38 and an electromagnetic drive coil 40. Each of the electromagnetic drive coils are connected in series by conductors 42 that are affixed in or upon the stator 10. The conductors 42 are turn connected through lines 44 to a switching structure 46 which includes a polarity reversing switch as described in detail below. Functionally, the reversing switch 46 cooperates with a switching track 48 (borne on the rotor 20) to properly drive the electromagnets 36 so that cooperating electromagnets 50 in the rotor 20 are approximately either attracted or repelled.

The rotor electromagnets 50 are carried in a circular pattern by the rotor 20 substantially coinciding to the circular pattern of the electromagnets 36 in the stator 10. The electromagnets of both units are generally similar, that is, the rotor magnets 50 include an armature 52 and an electromagnetic driving coil 54. The electromagnetic driving coils 54 of each of the rotor electromagnets 50 are connected in parallel electrical configuration as indicated by conductors 56 (shown in phantom). The conductors 56 are in turn connected through conductors 58 to slip rings 60 engaged by contact brushes 62. The brushes 62 may be mounted on support springs 64, for example, to be biased into forceful engagement with the slip rings 60 thereby assuring effective electrical connection.

It is to be noted, that while the shaft 18 may rotate freely with respect to the stator 10 in the bearing 34, the rotor 20 is affxed to the shaft 18 by a key 64. Therefore, the rotors, as the rotor 20 are effectively locked to the shaft 18 for integral movement as a unit.

As the rotor 20 turns in relation to the stator 10 (as described below) the track 48 (FIGURE 4) controls the switching structure 46 to establish the plurality of the electromagnets 50 in driving relationship to the stationary electromagnets 36. This mode of operation will be apparant from the consideration of FIGURE 3 which indicates the relationship of single electromagnets in each of the rotors 20, 22, and 24 with respect to a related single electromagnet in each of the stators 10, 12, and 14. Specifically, the electromagnet 50 in the rotor 20 is shown with respect to the electromagnet 36 of the rotor 10. Similarly, electromagnets 66 and 68 of the rotors 22 and 24 respectively, are indicated in positions relative to stationary electromagnets 70 and 72 of the stators 12 and 14. The electromagnets 50, 66, and 68 are all coupled to the shaft 18 for rotary motion; however, as indicated in FIGURE 3 a segment of the rotary motion is illustrated in a plane for ease of explanation. In this regard, the motion of the rotors 20, 22, and 24 is upward as indicated in the drawing.

The magnetic driving forces to propel the rotors 20, 22, and 24 is provided between the individual electromagnets in each of the rotors and the associated electromagnets in their associated stators. Specifically, the electromagnet 50 is indicated to have passed the electromagnet 36, so that the internal or abutting end of the armature 52 is moving away from the internal end of the armature 38. The armature 52 is always magnetized to the same polarity, specifically, as shown, the internal end 76 is "south" and the external end 78 is "north." A similar polarity sense is provided for all the rotary electromagnets in each of the rotors 20, 22 and 24. However, the polarity of the armature 38 (along with the other stationary armatures) is alternated. Specifically, as shown, the armature 38 (stator 10) is magnetized with its internal end 80 of "south" polarity and its external end 82 of "north" polarity. It is therefore apparent that the "south pole" of the armature end 76 repels the "south pole" at the internal armature end 80. As a result, the electromagnet 50 is forcibly driven upwardly (as indicated). Thus, at the instant depicted in FIGURE 3 the rotor 20 is driven by repelling magnetic forces.

At the same instant, the electromagnet 66 (carried in rotor 22) is attractively forced in the same direction by a mutual magnetic attraction with the electromagnet 70. That is, the internal pole of the armature 66 is "south" while the internal pole of the electromagnet 70 is "north." As a result, these magnets are attracted, again with the result that the electromagnet 66 is driven upwardly, as indicated, by providing the desired propulsion.

The third driving combination including stator 14 and rotor 24 lies in a neutral position. That is, although the electromagnet 68 is energized, the electromagnet 72 is cut off. These magnets may be considered in a "dead center" position with the result that the electromagnet 72 is de-energized to avoid forces which would otherwise tend to brake the motor. Of course, a breaking or "dead center" condition also exists when the rotary electromagnets lie midway between a pair of stationary electromagnets. Therefore, two "dead center" positions exist for each cyclic phase, and both are sensed between the track 48 and the switching unit 46 to cut off current flow in the stationary electromagnets during such periods.

To accomplish the switching operation, the track 48 (FIGURE 4) engages the switching structure 46 to establish four different cyclic time-related conditions. As indicated in FIGURE 4 with reference to the rotor 20, its movement in relation to the single stationary switching structure establishes changing polarity for the adjacent electromagnet on the stator as generally indicated by zones 85. Specifically, during the period when the electromagnet 50a is in contiguous axial alignment with a similar stator electromagnet, the stator electromagnet provides essentially no magnetism as indicated by the area 86. Subsequently, as the rotor moves so that the stationary electromagnet of the stator becomes aligned with an area 88, during which period the stator electromagnet is driven to provide a "south" pole repelling the "south" pole of the electromagnet 50a. Subsequently, another "dead center" position is approached as indicated by the area 90, during which the stator electromagnet is cut off, after which the stator electromagnet is approached by the area 91 and is driven to provide a "north" pole for attraction to the "south" pole of the electromagnet 50b.

Thus, the track 48 includes sections that are illustrated in plan view in FIGURE 3. The cooperation of the track with the switching structure 46 as illustrated in FIGURE 5. The switching structure 46 includes crossed switchblades 96 and 98 which are pivotally affixed at base terminals 100 and 102 respectively and both blades may engage either of the contact bars 104 or 106. That is, in its residual position, the switchblade 96 dwells against the contact bar 106, thereby connecting the terminal 100 to the contact bar 106. Similarly, in a residual position the switchblade 98 connects the terminal 102 to the contact bar 104. However, as the cam surface of the track 48 lifts the switchblades 96 and 98, they make no contact until the track becomes sufficiently wide to drive the switchblades against their aligned contact bars. That is, when the switchblades 96 and 98 are fully separated, the switchblade 96 engages the contact bar 104 while the switchblade 98 engages the contact bar 106. Thus, the contacts afforded by the switchblades 96 and 98 are driven to provide three distinct electrical conditions. First (as shown), a positive current flows from the terminal 110 through the switchblade 96 to the contact bar 106 and out the conductor 112 returning through the conductor 114 through the contact bar 104, the switchblade 98 and then to the return terminal 116.

Of course, in the condition in which the switchblades 96 and 98 are raised from the contact bars, no current flows. The third condition occurs when the contact switchblades are fully lifted to dwell against their aligned contact bars establishing currents in the reverse direction. In this position, the positive current flows from the terminal 110 through the switchblade 96 to the contact bar 104 then through the conductor 114, returning through the conductor 112 to the contact bar 106, through the switchblade 98 and to the negative terminal 116. Thus, the track 48 (FIGURE 5) sets the switchblades 96 and 98 to provide appropriate magnetic polarities for the stator armatures to alternately attract and repel the associated rotor armatures during time-separated intervals to avoid braking forces.

The detailed repeating pattern of the track 48 is best illustrated in FIGURE 3. The brief period when current is cut off is provided by a tapered leading edge 120 of a track section. Immediately following, is the full track section 122 which fully raises the switchblades in the switching structure and which is followed by a narrow section 124 which accomplishes an open-circuit condition. Following the section 124 is a void, during which the switchblades are permitted to drop into engagement with their opposed contact bars.

As the motor operates, the polarity of the electromagnets in the stator change synchronously to accommodate the continued rotation of the rotors along with the shaft 18 (FIGURE 1). Thus, the system affords an effective and very efficient motor which may be economically manufactured and which is adaptable for use in many different applications.

It is also to be noted that the offset or staggered relationship of the rotors in relation to the shaft 18 affords a smooth drive. However, various other combinations, as in units of three are practical. Of course, the structural features as described herein, although several are basic hereto, may be variously modified within the scope of the present invention. Furthermore, various other features hereof will be readily apparent in specific applications with the result that the scope hereof is not to be limited in accordance with the present disclosure but rather shall be interpreted in accordance with the claims set forth below.

What is claimed is:
1. An electric motor comprising:
   at least one stator structure including a plurality of stator electromagnets supported in a fixed circular pattern;
   at least one rotor structure including a plurality of rotor electromagnets supported for rotation to pass in contiguous end-to-end relationship with said stator electromagnets; and
   switching means comprising a track affixed on one of said structures and a switch leaf means affixed on the other of said structures for engagement with said track said switching means being controlled by the position of said rotor structure relative to said stator structure to drive said electromagnets of said structures whereby said electromagnets of said rotor structure alternately attract and repel said electromagnets of said stator structure.

2. An electric motor according to claim 1 wherein said switch leaf means comprises a pair of spaced-apart parallel contact bars; a pair of movable switchbldes pivotally supported in aligned relationship with said bars and each biased to residually dwell against a diagonally related one of said bars.

3. An electric motor according to claim 1, including a plurality of stator structures and a plurality of rotor structures and wherein said stator structures each have the electromagnets therein angularly offset from those of other stator structures.

4. An electric motor according to claim 3, wherein said rotor structures and said stator structures are concentrically mounted and further including a common shaft upon which said structures are disposed.

5. An electric motor according to claim 1, wherein said switching means includes a pair of spaced-apart contact bars and first and second switchblades movable to engage said first and second contact bars; and means for positioning said switchblades whereby said blades are positioned to oppositely contact said bars and to dwell between said bars, depending upon the position of said rotor structure.

6. An electric motor according to claim 5, wherein said means for positioning said blades comprises a switching track including at least two sections to open said switching means and two sections to oppositely close said switching means.

References Cited

UNITED STATES PATENTS

| | | | |
|---|---|---|---|
| 3,335,348 | 4/1967 | Gossel | 310—68 X |
| 3,223,862 | 12/1965 | Webb | 310—68 |
| 3,161,733 | 12/1964 | Bowser et al. | 200—153.12 |
| 2,570,005 | 10/1951 | Pestarini | 310—112 X |
| 2,040,214 | 5/1936 | Ramirez et al. | 200—153.12 |
| 2,006,172 | 6/1935 | Klappauf | 310—112 X |
| 750,971 | 2/1904 | Haskins | 200—152.12 |
| 686,459 | 11/1901 | Johnson | 200—152.12 |
| 3,419,740 | 12/1968 | Dotto | 310—233 X |

MILTON O. HIRSHFIELD, Primary Examiner

MARK O. BUDD, Assistant Examiner

U.S. Cl. X.R.

200—153.12; 310—112, 114, 233